Feb. 27, 1968 G. S. GLEASON 3,370,379
HANGING FLOWER HOLDER
Filed Sept. 12, 1966

INVENTOR.
GORDON S. GLEASON
BY Eugene M. Eckelman
ATTORNEY

United States Patent Office 3,370,379
Patented Feb. 27, 1968

3,370,379
HANGING FLOWER HOLDER
Gordon S. Gleason, Rte. 1, Box 331,
Clackamas, Oreg. 97015
Filed Sept. 12, 1966, Ser. No. 578,879
6 Claims. (Cl. 47—34)

This invention relates to new and useful improvements in flower containers.

A primary objective of the present invention is to provide a flower container which is capable of shipment and storage in substantially flat condition, and which is readily assembled into its container condition without the use of tools.

A more particular object of the present invention is to provide a flower container which in knocked-down condition comprises a pair of end walls and a body member comprising a sheet of flexible material capable of being wrapped partially around the end walls and arranged to be secured thereto for forming an open top container; and more particularly to provide such a pair of end walls and a flexible body member which has longitudinal corrugations provided with selectively spaced transverse slots for receiving an edge portion of the end walls such that projecting portions of said end walls are capable of receiving fasteners to hold the body member attached to the end walls.

Still another object is to provide a knock-down flower container of the type described which is sturdy in construction but at the same time is simplified and inexpensive to manufacture.

Briefly stated, the flower container of the present invention comprises a pair of end walls and a body member which is adapted to be wrapped partially around the edge of the end walls and attached thereto. The body member comprises a corrugated construction and includes end slots in selected portions of the corrugations for receiving the end walls. Portions of said end walls project through the slots of the corrugated body member and receive fasteners for holding the unit assembled. The invention will be better understood and additional objects and advantages will become apparent from the following description taken in connection with the accompanying drawings which illustrate a preferred form of the device.

The present invention is illustrated herein as a flower container such as a hanging basket or the like, but it is to be understood that it may be used for purposes other than as flower containers.

Figure 1:
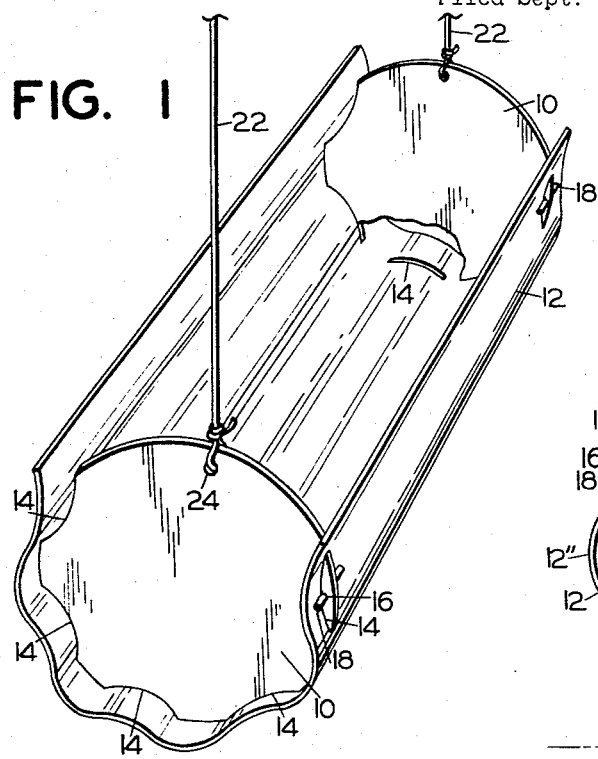
FIGURE 1 is a perspective view showing a first embodiment of the present flower container.
Figure 2:
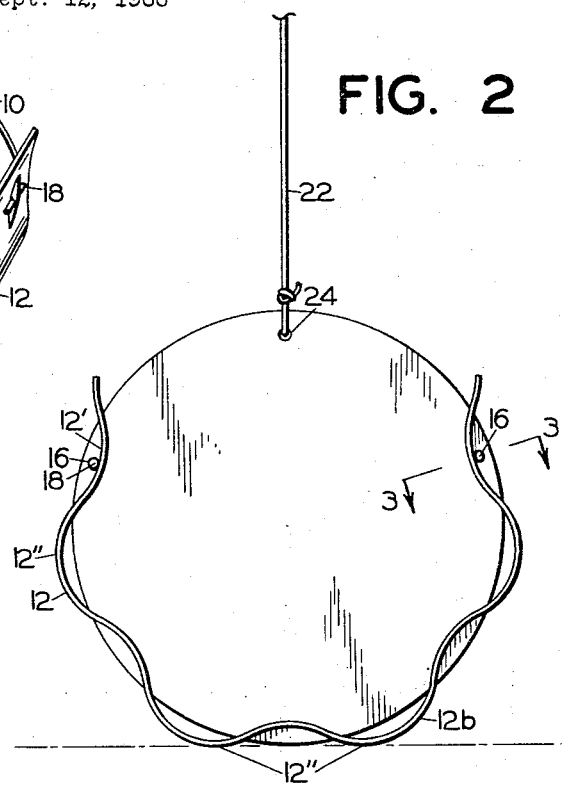
FIGURE 2 is an enlarged end view of the structure of FIGURE 1.
Figure 3:
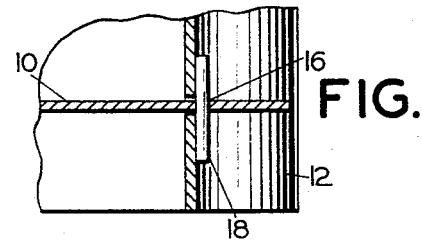
FIGURE 3 is an enlarged, fragmentary sectional view taken on the line 3—3 of FIGURE 2.

Referring in particular to the drawings and first to FIGURES 1, 2 and 3, the container comprises a pair of plate-like end walls 10 of identical construction which in this embodiment are generally circular in construction, FIGURE 2. The container includes a body member 12 formed of a rectangular sheet of corrugated material which is flexible so that as shown in FIGURE 1 it can be wrapped partially around the edges of the end walls to form the container.

For purposes hereof, the portions of the corrugations which extend inwardly are designated by the numeral 12′ and the portions of the corrugations which extend in the opposite direction are designated by the numeral 12″, and in accordance with principles of the present invention the corrugated portions 12′ which extend inwardly of the container are provided with transverse slots 14 adjacent each end thereof for receiving a peripheral portion of the end walls. More particularly, when the body member 12 is wrapped partially around the end walls, as shown in FIGURE 1, the slots 14 receive portions of the end walls and in fact are of sufficient length and dimension to permit portions of the end walls to project outwardly therethrough.

The end walls 10 are provided with at least two apertures 16 arranged to receive pins 18 or the like which hold the structure together. As seen in FIGURE 2, the apertures 16 are provided selectively in the end walls so as to be disposed at the two upper corrugated portions 12′, although it is to be understood that such apertures may be provided for other or all corrugated portions 12′.

End walls 10 are necessarily constructed of a substantially rigid material and the body member 12 is necessarily formed of a material which is flexible but at the same time which is sufficiently sturdy to hold the weight of flowers and soil placed in the container. A preferred material for use both as the body member 12 and the end walls 10 is glass fiber sheet material since such material has sufficient rigidity to form the end walls 10 and is sufficiently flexible but sturdy to form the body member 12.

In the construction of FIGURE 1, the body member is formed of a width such as to have an even number of outwardly directing corrugated portions 12″ so that, as viewed in FIGURE 2, when the container is assembled two corrugated portions 12″ are disposed in a common plane at the bottom to form feet for the container. Thus, the container may be seated on a flat surface for self support. If it is desired to hang the container up, it may be provided with hanging lines 22 connected to the end walls by means of suitable apertures 24 in the end walls.

Figure 4:
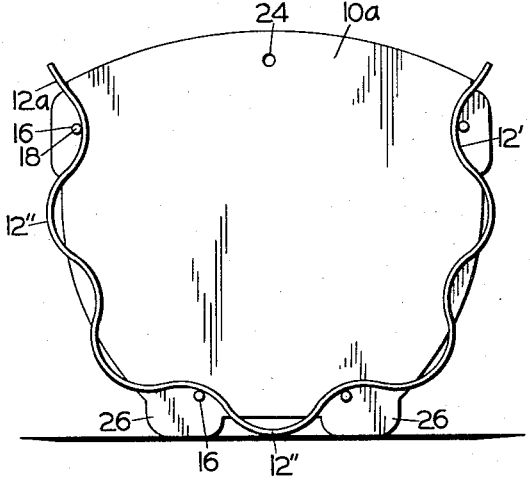
FIGURE 4 is an end view similar to FIGURE 2 but showing a modified form of structure.

FIGURE 4 shows a container embodying features of the present invention but in this embodiment the end walls 10a are formed with feet members 26 and the body member 12a is of a transverse dimension to include an odd number of outwardly directed corrugated portions 12″. In this arrangement, a single corrugated portion 12″ is pointed downwardly. End walls 10a are provided with suitable apertures 16 for receiving the holding pins 18, and as illustrated a pair of such holes may also be provided at the bottom in the area of the legs 26.

Figure 5:
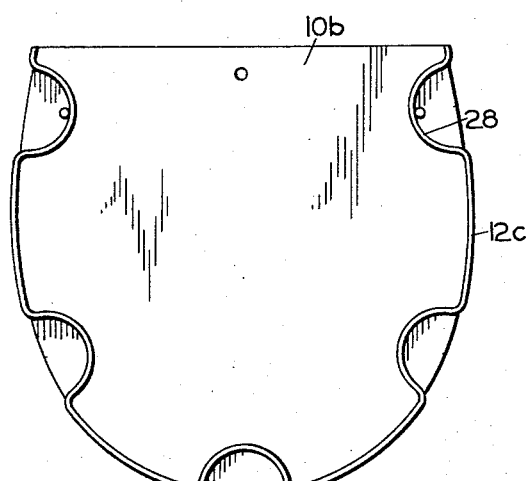
FIGURE 5 is also an end view similar to FIGURE 2 but showing still another form of structure.

FIGURE 5 shows still another embodiment of the invention wherein the body member 12c instead of utilizing the conventional corrugation material, wherein the corrugations comprise adjacent reversely turned curvatures, has inwardly directed depressions 28 but no outwardly directed depressions. In this embodiment, each of the depressions 28 is provided with the transverse slot 14 as in the other embodiments for receiving end walls 10b.

According to the present invention, a flower container is provided which is adapted to be shipped and stored in knocked-down condition and assembled by the retailer or customer. When so knocked down the container comprises a flat, compact package to save on space and shipping cost. To assemble the container, the body member is merely wrapped around the end walls and the pins 18 inserted in the apertures 16. These pins hold the container securely together, and if it is later desired to disassemble the container the pins are merely removed and the body member disconnected from the end walls. In addition to providing a knock-down structure for shipment and storage, plants can be easily removed from the container by taking out the pins and straightening the body member somewhat in order conveniently to get at the plants. For this purpose, it may be desired to provide more than just two apertures 16 at the top, namely, to provide additional apertures at the bottom as shown in FIGURE 4, in order that the container can be partially disassembled by removing only the top pins for taking out plants.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A flower container comprising a pair of end walls having a bottom edge and side edges, a body member including a sheet of flexible material wrapped around the bottom and side edges of said end walls to form a container closed at the bottom, sides and ends and open at the top, said body member having means defining a plurality of longitudinal depressions extending from end to end thereof, means defining transverse slots in said body member, said slots being disposed adjacent each end of said body member and being located only in the depressed portions thereof whereby in the wrapped position of said body member a portion of said end walls project outwardly therethrough, and holding means connected with the projecting portion of said end walls to hold said body member in wrapped position on said end walls.

2. The flower container of claim 1 wherein said end walls at projecting portions thereof have apertures therein and said holding means comprise fasteners mounted in said apertures.

3. The flower container of claim 1 wherein said end walls at projecting portions thereof have apertures therein and said holding means comprise fasteners removably mounted in said apertures.

4. The flower container of claim 1 wherein said body member is corrugated and said longitudinal depressions comprise inwardly directed portions of the corrugations.

5. The flower container of claim 1 wherein one of said longitudinal depressions is centrally located at the bottom of said body member whereby to form longitudinally extending feet on opposite sides thereof for supporting the container in upright position on a supporting surface.

6. The flower container of claim 1 wherein said end walls have bottom feet members arranged to project through said slots and arranged to support the container in upright position on a supporting surface.

References Cited

UNITED STATES PATENTS

| | | | |
|---|---|---|---|
| D. 170,833 | 11/1953 | Rebora | 119—23 XR |
| 1,405,568 | 2/1922 | Conklin | 47—34 |
| 2,374,390 | 4/1945 | Snyder | 229—41 |
| 3,295,498 | 1/1967 | Brown | 119—23 |

ROBERT E. BAGWILL, *Primary Examiner.*